US008849742B2

(12) United States Patent
Lovett et al.

(10) Patent No.: US 8,849,742 B2
(45) Date of Patent: Sep. 30, 2014

(54) METHOD AND APPARATUS FOR PROVIDING CHARGING STATE ALERTS

(75) Inventors: Karin Lovett, Novi, MI (US); Beth Ann Dalrymple, Livonia, MI (US); David Hayes, Northville, MI (US); Thanh Duc Pham, Canton, MI (US); Jesus Cardoso, Allen Park, MI (US); Darko Acevski, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 331 days.

(21) Appl. No.: 13/357,072

(22) Filed: Jan. 24, 2012

(65) Prior Publication Data

US 2013/0191321 A1 Jul. 25, 2013

(51) Int. Cl.
*G06N 7/00* (2006.01)
*G06N 5/04* (2006.01)

(52) U.S. Cl.
CPC ....................................... *G06N 5/04* (2013.01); Y02T 10/7044 (2013.01)
USPC .......................................................... 706/58

(58) Field of Classification Search
CPC .............................. G06N 5/04; Y02T 10/7044
See application file for complete search history.

(56) References Cited

U.S. PATENT DOCUMENTS

| 5,202,617 A | 4/1993 | Nor |
| 5,301,113 A | 4/1994 | To et al. |
| 5,539,399 A | 7/1996 | Takahira et al. |
| 5,686,895 A | 11/1997 | Nakai et al. |
| 5,790,976 A | 8/1998 | Boll et al. |
| 5,892,346 A | 4/1999 | Moroto et al. |
| 5,913,917 A | 6/1999 | Murphy |
| 5,916,298 A | 6/1999 | Kroiss et al. |
| 6,198,995 B1 | 3/2001 | Settles et al. |
| 6,337,621 B1 | 1/2002 | Ogino et al. |
| 6,591,185 B1 | 7/2003 | Polidi et al. |
| 6,836,728 B2 | 12/2004 | Shimabara |
| 6,864,807 B2 | 3/2005 | Todoriki et al. |
| 6,947,732 B2 | 9/2005 | Fraser |
| 7,127,350 B2 | 10/2006 | Oikubo |

(Continued)

FOREIGN PATENT DOCUMENTS

| EP | 2102598 | 1/2013 |
| WO | 2009071364 A1 | 6/2009 |

(Continued)

OTHER PUBLICATIONS

Ford Motor Company, "SYNC with Navigation System," Owner's Guide Supplement, SYNC System Version 1 (Jul. 2007).

(Continued)

*Primary Examiner* — Li-Wu Chang
(74) *Attorney, Agent, or Firm* — Jennifer M. Stec; Brooks Kushman P.C.

(57) ABSTRACT

A computer implemented method includes determining whether a time of day corresponds to a charging window, responsive to a determination that a vehicle is in a non-charging state. The method also includes retrieving a start time and charge requirement for an upcoming journey. The method further includes determining if sufficient time remains to charge a vehicle to the charge requirement, responsive to a determination that the time of day corresponds to the charging window. Also, the method includes alerting a user to the non-charging state, responsive to a determination that insufficient time remains to charge the vehicle to the charge requirement.

17 Claims, 4 Drawing Sheets

(56) References Cited

U.S. PATENT DOCUMENTS

| | | |
|---|---|---|
| 7,142,664 B2 | 11/2006 | Seligmann |
| 7,149,623 B2 | 12/2006 | Flick |
| 7,277,780 B2 | 10/2007 | Meier-Arendt et al. |
| 7,346,630 B2 | 3/2008 | Eichstaedt et al. |
| 7,402,978 B2 | 7/2008 | Pryor |
| 7,433,714 B2 | 10/2008 | Howard et al. |
| 7,444,384 B2 | 10/2008 | Horvitz |
| 7,586,956 B1 | 9/2009 | Mishra et al. |
| 7,668,644 B2 | 2/2010 | Tengler et al. |
| 7,873,466 B2 | 1/2011 | Kong |
| 7,925,426 B2 | 4/2011 | Koebler et al. |
| 8,000,842 B2 | 8/2011 | Yi et al. |
| 8,005,453 B2 | 8/2011 | Van Bosch et al. |
| 8,103,434 B2 | 1/2012 | Helbing et al. |
| 8,239,127 B2 | 8/2012 | Kono et al. |
| 8,255,152 B2 | 8/2012 | Barth et al. |
| 8,284,039 B2 | 10/2012 | Baker et al. |
| 8,290,695 B2 | 10/2012 | Hiestermann et al. |
| 8,290,701 B2 | 10/2012 | Mason et al. |
| 8,294,286 B2 | 10/2012 | Hunter |
| 8,401,792 B2 | 3/2013 | Yeh et al. |
| 8,478,642 B2 | 7/2013 | Dey et al. |
| 8,504,236 B2 | 8/2013 | Guo et al. |
| 2002/0164998 A1 | 11/2002 | Younis |
| 2003/0023374 A1 | 1/2003 | Shimabara |
| 2004/0073643 A1 | 4/2004 | Hayes et al. |
| 2004/0162669 A1 | 8/2004 | Nagamasa |
| 2004/0243307 A1 | 12/2004 | Geelen |
| 2005/0080552 A1 | 4/2005 | Feldman et al. |
| 2006/0002413 A1 | 1/2006 | Tsutazawa et al. |
| 2006/0007022 A1 | 1/2006 | Endo et al. |
| 2006/0290490 A1 | 12/2006 | Kraus et al. |
| 2007/0052552 A1 | 3/2007 | Suzuki |
| 2007/0112475 A1 | 5/2007 | Koebler et al. |
| 2007/0150171 A1 | 6/2007 | Tengler et al. |
| 2007/0271035 A1 | 11/2007 | Stoschek et al. |
| 2008/0027606 A1 | 1/2008 | Helm |
| 2008/0042489 A1 | 2/2008 | Lewis et al. |
| 2009/0021218 A1 | 1/2009 | Kelty et al. |
| 2009/0099992 A1 | 4/2009 | Horvitz |
| 2009/0110163 A1 | 4/2009 | Gupta |
| 2009/0119385 A1 | 5/2009 | Horvitz |
| 2009/0138188 A1 | 5/2009 | Kores et al. |
| 2009/0141173 A1 | 6/2009 | Pugel |
| 2009/0265099 A1 | 10/2009 | Gottlieb |
| 2009/0309709 A1 | 12/2009 | Bevacqua et al. |
| 2010/0017249 A1 | 1/2010 | Fincham et al. |
| 2010/0060016 A1 | 3/2010 | Hunter |
| 2010/0070253 A1 | 3/2010 | Hirata et al. |
| 2010/0076675 A1 | 3/2010 | Barth et al. |
| 2010/0094496 A1 | 4/2010 | Hershkovitz et al. |
| 2010/0106514 A1 | 4/2010 | Cox |
| 2010/0106603 A1 | 4/2010 | Dey et al. |
| 2010/0110077 A1 | 5/2010 | Grossman et al. |
| 2010/0131188 A1 | 5/2010 | Yeh et al. |
| 2010/0138142 A1 | 6/2010 | Pease |
| 2010/0169008 A1 | 7/2010 | Niwa et al. |
| 2010/0207772 A1 | 8/2010 | Yamamoto |
| 2010/0235076 A1 | 9/2010 | Ofek et al. |
| 2010/0237985 A1 | 9/2010 | Landau-Holdsworth et al. |
| 2010/0256830 A1 | 10/2010 | Kressner et al. |
| 2010/0274689 A1 | 10/2010 | Hammad et al. |
| 2010/0286909 A1 | 11/2010 | Tate, Jr. et al. |
| 2011/0040438 A1 | 2/2011 | Kluge et al. |
| 2011/0060495 A1 | 3/2011 | Kono et al. |
| 2011/0060517 A1 | 3/2011 | Kono et al. |
| 2011/0191265 A1 | 8/2011 | Lowenthal et al. |
| 2011/0224841 A1 | 9/2011 | Profitt-Brown et al. |
| 2011/0224852 A1 | 9/2011 | Profitt-Brown et al. |
| 2011/0225105 A1 | 9/2011 | Scholer et al. |
| 2011/0238457 A1 | 9/2011 | Mason et al. |
| 2011/0251789 A1 | 10/2011 | Sanders et al. |
| 2011/0307166 A1 | 12/2011 | Hiestermann et al. |
| 2011/0309926 A1 | 12/2011 | Eikelenberg et al. |
| 2011/0313603 A1 * | 12/2011 | Laberteaux et al. ............ 701/22 |
| 2012/0016551 A1 | 1/2012 | Krause et al. |
| 2012/0016576 A1 | 1/2012 | Huang et al. |
| 2012/0022904 A1 | 1/2012 | Mason et al. |
| 2012/0029800 A1 | 2/2012 | Kluge et al. |
| 2012/0065831 A1 | 3/2012 | Ross et al. |
| 2012/0158299 A1 | 6/2012 | Cerecke et al. |
| 2012/0179315 A1 | 7/2012 | Tate et al. |
| 2012/0179362 A1 | 7/2012 | Stille |
| 2012/0232783 A1 | 9/2012 | Calkins et al. |
| 2012/0271542 A1 | 10/2012 | Arcot et al. |
| 2012/0306446 A1 * | 12/2012 | Suganuma et al. ........... 320/109 |
| 2013/0116868 A1 * | 5/2013 | Erko et al. .................... 701/22 |

FOREIGN PATENT DOCUMENTS

| | | |
|---|---|---|
| WO | 2009071369 A1 | 6/2009 |
| WO | 2011003813 | 1/2011 |
| WO | 2011021776 A2 | 2/2011 |
| WO | 2011035427 A1 | 3/2011 |

OTHER PUBLICATIONS

Ford Motor Company, "SYNC," Owners's Guide Supplement, SYNC System Version 1 (Nov. 2007).

Ford Motor Company, "SYNC with Navigation System," Owner's Guide Supplement, SYNC System Version 2 (Oct. 2008).

Ford Motor Company, "SYNC," Owner's Guide Supplement, SYNC System Version 2 (Oct. 2008).

Ford Motor Company, "SYNC with Navigation System," Owner's Guide Supplement, SYNC System Version 3 (Jul. 2009).

Ford Motor Company, "SYNC," Owner's Guide Supplement, SYNC System Version 3 (Aug. 2009).

Kermit Whitfield, "A hitchhiker's guide to the telematics ecosystem," Automotive Design & Production, Oct. 2003, http://findarticles.com, pp. 103.

News Release, "Chevrolet and OnStar Give Volt Owners 24/7 Connection and Control via Wireless Smartphone Application", released Jan. 5, 2010.

Josie Garthwaite, "GM's Volt to Launch With Cell Phone App for Remote Control", Jan. 6, 2010, printed from http:/gigaom.com/cleantech/gms-volt-to-launch-with-cell-phone-app-for-remote-control/, Dec. 30, 2010.

GM Onstar Mobile Demonstration Capability for Volt img. retrieved from: Hayes, JW, "GM OnStar App for Chevy Volt". Auto and Racing News, Jan. 6, 2010. <http://autoandracingnews.wordpress.com/2010/01/06/gm-onstar-app-for-chevy-volt/>.

BlackBerry Curve Series, BlackBerry Curve 9300/9330—Smartphones User Guide, Version: 6.0 (2011), pp. 144.

BlackBerry Curve Series, BlackBerry Curve 9300/9330—Smartphones User Guide, Version: 6.0 (2011).

* cited by examiner

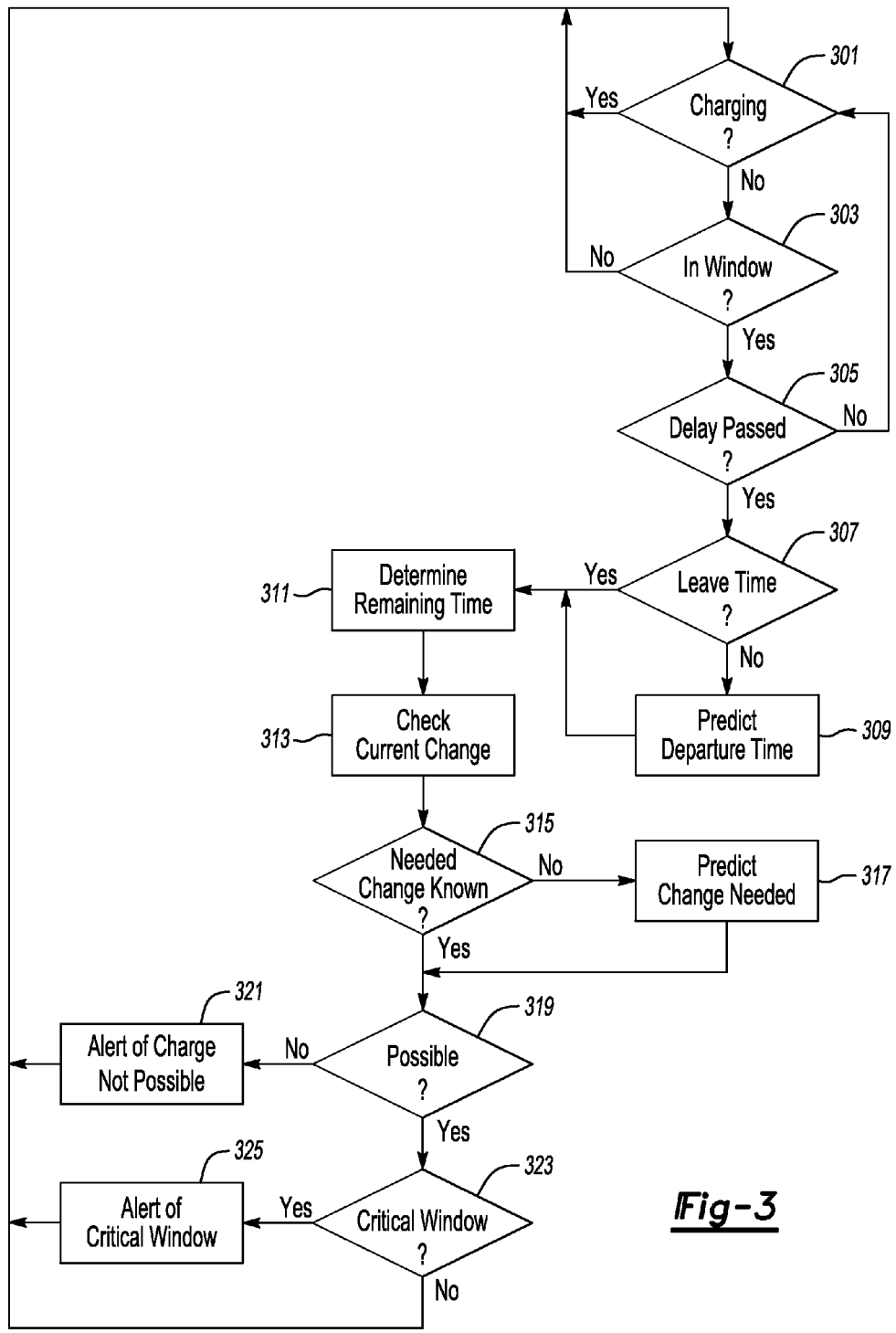

METHOD AND APPARATUS FOR PROVIDING CHARGING STATE ALERTS

TECHNICAL FIELD

The illustrative embodiments relate to methods and apparatuses for providing charging state alerts.

BACKGROUND

While battery electric vehicles (BEVs) and hybrid electric vehicles (HEVs) have increased in popularity over the years, the length of the time to charge these vehicles can still produce situations of anxiety for owners. For example, a plug-in BEV or HEV that an owner could plug into an outlet in their garage may take over an hour to charge appropriately for the next days travel, as compared to, for example, a few minutes worth of a stop at a local gas station for refueling a gasoline powered vehicle.

Typically, these time constraints will not cause a problem, and may even be more convenient, since they can apply while a user is comfortably within a house, or even sleeping in bed. While the charging can usually occur during such times, the fact that the user is not actually present at the vehicle, to confirm that charge is being added, can result in several potential problems.

In one instance, incidental contact with a power cord can cause a vehicle to become unplugged. This could be caused by, for example, a pet or another person in the garage. Since the contact may be overlooked or unknown, the owner of the vehicle may not discover that the vehicle came unplugged until attempting to start the vehicle the next day.

In another instance, a power outage may result in a no-charge state. If the outage occurred while the owner was awake, at least the owner would have some indication that the vehicle may not be charging (based on the fact that the house has no power). People, however, often become flustered during power outages, and it may not occur to an owner until much later, or the next morning, that the power outage also resulted in a vehicle with no charge.

Additionally or alternatively, the power outage could occur while an owner was asleep. In such a case, the owner may not know about the power outage at all, until awakening to an uncharged vehicle.

SUMMARY

In a first illustrative embodiment, a computer implemented method includes determining whether a time of day corresponds to a charging window, responsive to a determination that a vehicle is in a non-charging state. The illustrative method also includes retrieving a start time and charge requirement for an upcoming journey. The method further includes determining if sufficient time remains to charge a vehicle to the charge requirement, responsive to a determination that the time of day corresponds to the charging window. Also, the method includes alerting a user to the non-charging state, responsive to a determination that insufficient time remains to charge the vehicle to the charge requirement.

In a second illustrative embodiment, a machine readable storage medium stores instructions which, when executed by a processor, cause the processor to perform the method including determining whether a time of day corresponds to a charging window, responsive to a determination that a vehicle is in a non-charging state. The illustrative method also includes retrieving a start time and charge requirement for an upcoming journey. Further, the illustrative method includes determining if sufficient time remains to charge a vehicle to the charge requirement, responsive to a determination that the time of day corresponds to the charging window. The illustrative method also includes alerting a user to the non-charging state, responsive to a determination that insufficient time remains to charge the vehicle to the charge requirement.

In a third illustrative embodiment, a system includes a processor, in communication with a vehicle network, a local storage, in communication with the vehicle network, a vehicle power source, in communication with the vehicle network, and a transceiver, in communication with at least the processor. In this illustrative example, the processor is configured to determine whether a time of day corresponds to a charging window, responsive to a determination that a vehicle is in a non-charging state, based at least in part on information retrieved from the vehicle network. The processor is further configured to retrieve a start time and charge requirement for an upcoming journey from the local storage, and determine if sufficient time remains to charge a vehicle to the charge requirement, responsive to a determination that the time of day corresponds to the charging window, based at least in part on a difference between a current time and the start time, and at least in part on an observed rate of charging. Also, the processor is configured to alert a user to the non-charging state, responsive to a determination that insufficient time remains to charge the vehicle to the charge requirement, utilizing at least the transceiver to send a message for transmission to the user.

BRIEF DESCRIPTION OF THE DRAWINGS

FIG. 3 shows a second illustrative example of a charging alert process;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
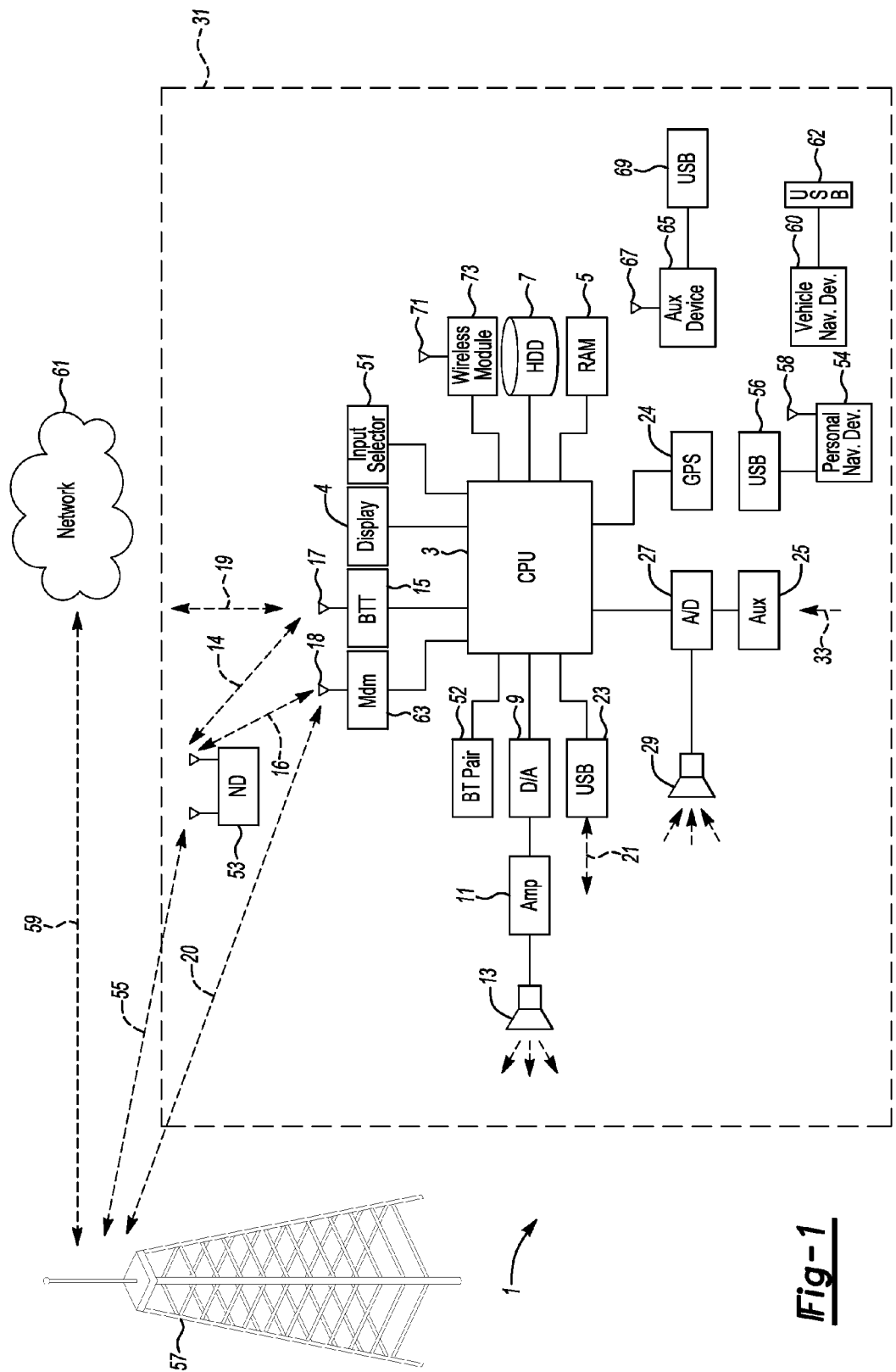
FIG. 1 shows an illustrative example of a vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (firewire), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Although modern electric vehicles may offer the convenience of home-charging, while a user is away from a vehicle, potential problems with a power connection (e.g., without limitation, unplugging, outlet failure, power outage) can leave an owner unaware that a vehicle is not actually charging. The illustrative embodiments present some exemplary aspects of the invention which can aid in notifying a user when a power connection has been interrupted.

While all embodiments are capable of near-constant or constant notification, repeated and endless communication may annoy a user. Accordingly, it is understood that repetitive warnings can be truncated after a certain number of warnings (including a single warning) and that brief interruptions in the power supply can be accounted for in all cases. While optional, these considerations may prevent users from being overwhelmed with warnings, and may also allow brief power interruptions to go unwarned, as they may generally tend not to greatly impact the overall charge state.

Figure 2:
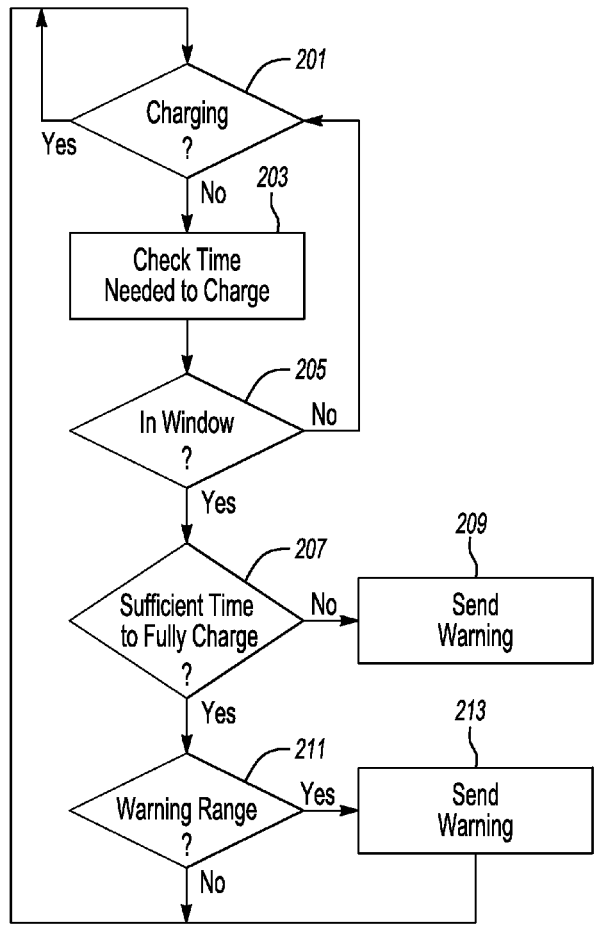
FIG. 2 shows an illustrative example of a charging alert process.

FIG. 2 shows an illustrative example of a charging alert process. In this illustrative example, the process (which can be, for example, an on-board monitoring process, running off of the battery or a backup power supply) first checks to see if a vehicle is currently charging 201. In this example, if the vehicle is charging, then the process for reporting a charge interruption may not be needed. A delay (not shown) of some time period can be interspersed before checking charging again, or the process can simply continue to monitor charging continuously until a charging interruption registers.

If the vehicle charging ceases, the process may check a remaining amount of time needed to charge 203. In at least one implementation, the process may have a known vehicle start time (i.e., the time the next day, or later the same day, the vehicle is needed) and a known needed charge level. This information can be fully or partially input by a user, or it can be fully or partially determined based on observations of a user's travel habits.

For example, in one instance, a user may note that on weekdays the vehicle is needed at approximately 7 AM, and that a 20-mile each way round-trip journey is contemplated. Based on fuel economy statistics, and any other known information (weather, traffic, etc.) the process can "know" how much power is required to complete such a trip. This information can then be used to determine a minimum charge requirement for trip completion, with a buffer built in if desired.

Based on a current charging rate, and known minimum charge, a total time needed to charge the vehicle to the minimum level can be determined 203. Additionally, the user may only wish to charge a vehicle during certain power company "windows". For example, power usage may be cheaper between certain hours, given a particular locale and power company guidelines. If the optimal pricing on usage is obtained from midnight to five AM, the user may only wish to charge during this window. Accordingly, in this example, even if the vehicle is not charging, the process checks to see if the time is within a charging window 205 before alerting the user of the charging interruption.

Also, in this example, the process determines whether sufficient time to charge the vehicle remains 207. For example, if a user arrived home at 3 AM and plugged in a vehicle, and needed the vehicle at 7 AM, four total hours to charge the vehicle would remain. If charging were interrupted at 3:30 AM, and the full four hours were needed to charge the vehicle, the process may determine that insufficient total time to fully charge the vehicle remains 207. In such a case, the process may alert a user 209 that the vehicle will not be fully charged to a predicted sufficient level to complete the next day's journey. In this case, the user may correct any charging interruption process, and take action to achieve the remaining charge. This can include, but is not limited to, setting a later end point for a window and sleeping in, stopping for additional power on the way to/from the destination, etc.

If sufficient time remains, the process checks to see if a no-charge condition is approaching a warning range. If a charging window was from midnight to 7 AM, and power went out at 1 AM, but only three hours was needed to charge the vehicle, the 1 AM power outage does not necessarily present a sufficient problem at 1 AM worthy of alerting a user. But as 3 or 4 AM approaches, if charging has not yet resumed, a problem could arise. In this case, as a warning range (in this example, some suitable period of time wherein sufficient time remains to charge the vehicle as needed still remains) is approached, the process may alert the user to the continued no-charging state 213, so the user can take appropriate action.

The configuration of the time range can be up to the user. Some users may want to be alerted any time charging is interrupted prior to reaching a needed charge, other users may only want to be alerted if a critical situation is imminent. The user can set conditions for warning, and can also configure a window prior to a critical point in which warnings should be sent. The particulars of these choices are all contemplated to be within the scope of the invention.

FIG. 3 shows a second illustrative example of a charging alert process. In this illustrative example, the process again checks to see if the vehicle is charging 301. If the vehicle is not charging, the process determines if the time of day is within a designated charging window 303 (assuming any window has been designated at all).

If the time of day is within the charging window, the process may additionally check to see if a suitable delay has passed since the no-charge state was detected 305. For example, it may not be desirable to notify a user for an interruption of only a few minutes in charging. In this embodiment, a delay (user or OEM defined, for example) can be set such that only delays in charging over a certain length result in user notification. If the delay has not passed, the process continues to check to see if charging is on-going or has resumed.

Once a suitable delay has passed, the process determines if a departure time is known 307. If the user has established or entered a departure time, it may be specifically or generally known to the process. If there is not a known departure time, the process may attempt to predict a departure time 309. This can be done, for example, based on previously observed behavior and will be discussed in greater detail with respect to FIGS. 4A and 4B.

One a departure time is known, the process can determine an amount of time remaining prior to departure 311. The process can also check a current charge level 313, which may be additionally useful for determining if an alert should be sent to a user.

The process also checks to see if a particular required charge level is known 315. Again, this could be based on user input data (trip duration, distance, etc.). If there is insufficient information to "know" the needed charge, the process may attempt to predict a needed charge level 317, again discussed in more detail below.

Once the departure time, time remaining and needed charge level have been analyzed (and/or guessed, as appropriate) the process may determine if it is even possible, in the time remaining, to achieve the needed charge level 319. If it is not possible, the process may alert the owner to the situation 321, and then resume charge monitoring. Since the process relies on the owner to rectify a no-charging situation, the resumption of monitoring can result in additional warnings, if needed, that can help the owner perform the needed corrections.

If there is sufficient total time remaining, but the process is not yet nearing a critical point 323 (e.g., if there is more than a predetermined amount of surplus time remaining), the process may simply continue monitoring. Once there is less than the predetermined amount of surplus time remaining 323, the process may alert the owner that a critical window is approaching 325, so that the owner can take appropriate steps to rectify any problems.

Figure 4A:
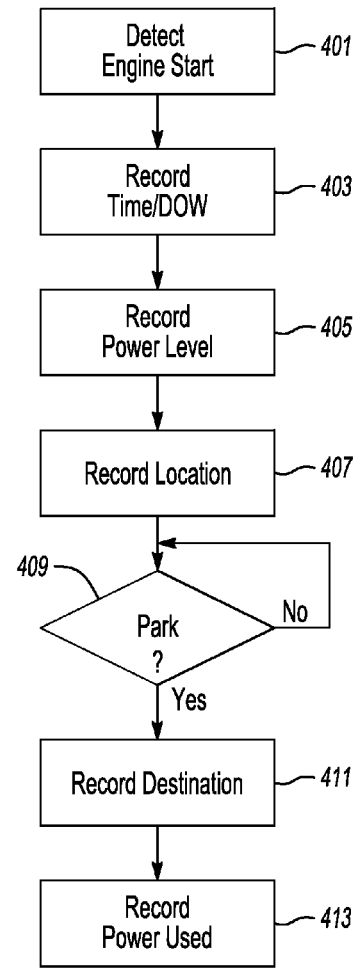
FIG. 4A shows an illustrative example of a stop/power recording process.

FIG. 4A shows an illustrative example of a stop/power recording process. This is just one example of how data can be recorded, to aid in future power need/time need evaluations, and it shows how a predictive process can be implemented with little overhead. Other predictive processes may also be used, as desired by one implementing the warning system.

In this illustrative example, the process detects that a vehicle engine has been started 401. Generally, this will correspond to the start of a trip, and a time of day and day of week are recorded 403. The recording of this information can be done so that predictions can be made for similar days of the week in following weeks, since many people follow a somewhat common schedule in terms of vehicle usage.

Also, a current power level is recorded 405. This can be used when a park state is detected to determine how much power was used during the course of a journey. In addition to the above information, a vehicle location is recorded 407. In this example, the vehicle location is also useful in predicting vehicle usage needs, since time and power needs are most likely to be common when the vehicle is departing from a common location. In other words, if the user lives in Michigan and the vehicle is parked in Ohio, then it is likely that the next day's journey will not be the typical journey for that day of the week (since the user is likely on a trip of some sort).

The process then continues to check whether or not the vehicle has entered a "park" state 409. A park state is used here as a proxy for stop detection, although other suitable determinations correlating to a journey end point may also be used. Also, in at least one embodiment, the process may require that the vehicle remain in the park state for some period of time, to ensure that more than a mere temporary stop is being made (e.g., fuel, food, etc.).

Once the process has determined that the vehicle has reached a destination, through an appropriate mechanism, the process may proceed to record the location of the destination 411 and an amount of power used to reach the destination 413. Recorded power usage can be later used to predict needed power to reach a destination. Recorded destination location can be later used to predict if a change in weather/traffic/etc. will require increased/decreased power to reach the destination. The destination can also, on a day by day basis, for example, be compared to other destinations to which the user travels on the same day of the week, to determine commonality of a certain destination, thus providing statistical likelihood of traveling to that destination.

Figure 4B:
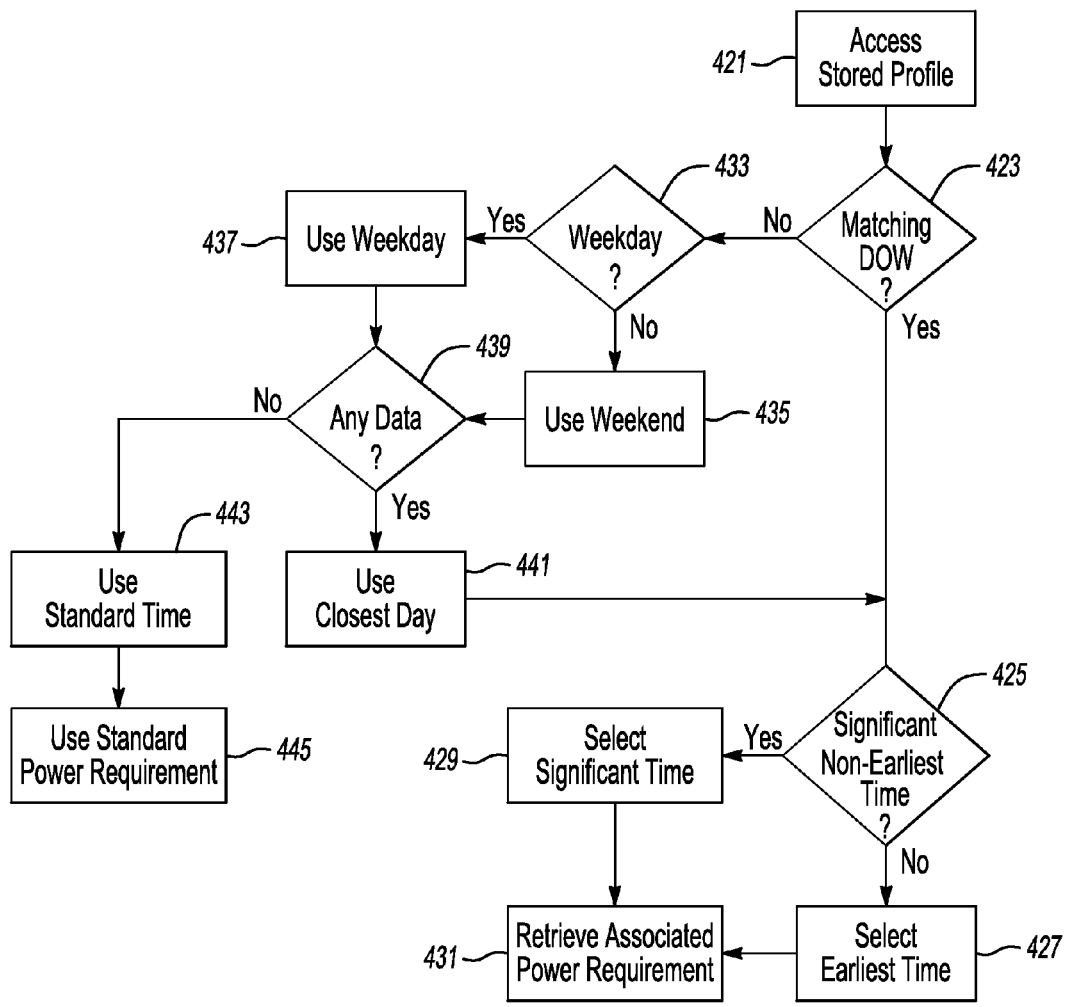
FIG. 4B shows an illustrative example of a stop/power usage prediction process.

FIG. 4B shows an illustrative example of a stop/power usage prediction process. In this illustrative example, a warning process may utilize the present process to help guess where a vehicle is headed, when a vehicle is needed, and how much power will be needed by the vehicle to reach the predicted destination.

The process first accesses a stored profile for one or more drivers of the vehicle 421. Which profile(s) is/are selected may depend on how many drivers a vehicle has, how frequently each driver uses the vehicle, etc. The process then determines if a current day of week matches any stored days of the week 423. For example, if today (or tomorrow morning, depending on the time) is Tuesday, the process will check to see if data has been stored for previous Tuesdays.

If there is data stored for similar days from previous weeks, the process may check to see if a significant non-earliest time exists 425. By significant non-earliest time, this example refers to a time, later than the earliest recorded usage time, that occurs a statistically significant number of times. For example, if a user typically goes to work at 8 AM, but one day left at 6 AM, then the earliest recorded data may be 6 AM, but the 8 AM departures would accumulate as being statistically significant. This check is made, in this example, because in the absence of such a time, the process will select the earliest known time 427, in an attempt to ensure that the user's vehicle will be suitably charged at the earliest likely moment of need.

Additionally, a buffer zone may be built in around recorded times, such that times within, for example, fifteen minutes of each other are all treated as a median time (or other suitable approximation). If there is a significant time, other than the earliest time, the process may select that time for use 429. Regardless of which time is selected, the process proceeds to retrieve an associated power requirement, saved with respect to that time 431.

Since, in this portion of this example, at least some data has been previously observed and recorded, the process can guess, even roughly, an approximation of how much power will be needed. If only one or two data points exist, the guess may have a higher likelihood of being incorrect, but if sufficient data points exist then the guess may be closer to an accurate one based on previously observed behavior.

If there is no data that matches the current day of the week 423, the process may determine whether or not the relevant day is a weekday 433. Since the majority of the population works on weekdays, the process may make some assumptions about usage until data can be recorded. If the process is implemented as soon as or soon after a vehicle is purchased, this "standard" data will only be needed on a short term basis.

If the day is a weekday, the process will select generic weekday data 437, otherwise the process will select generic weekend data 435. Next, in this example, the process determines if there is any data at all for a weekend day or a weekday 439. For example, if a vehicle process was first activated on a Wednesday, and it is the following Tuesday, there will be no Wednesday data, but there will be some saved weekday data. If there is weekday data, the process will use the closest day 441 (for example, utilizing a Monday or Wednesday for a Tuesday) or any other suitable combination of existing data. The process can then continue as previously described, substituting the data from the selected day(s) for the data that is not yet recorded for the current day of the week.

If there is no data suitable to use as a proxy for the current day of the week, the process will use a "standard time" 443. This could be, for example 7:30 AM, or any other suitable time likely to cover a significant portion of users, without creating situations likely to annoy too many users. For example, if 5 AM was selected, it would probably ensure a higher percentage of user coverage, but it may also ensure a much higher percentage of false positives on the charging results (i.e., vehicles that would be charged when they're actually needed, may not be charged by 5 AM). Based on a particular implementation's needs, the give and take between the two constraints (and any other constraints) can be considered and adjustments can be made accordingly.

Once the process has selected a departure time, it may also guess at a standard power need. In one example, this could always be "full," but again, a full power cell may be more than most people need and may result in many false positives. The manufacturer or other implementer of the process can determine a suitable compromise likely to result in a desired number of false positives while at the same time still maintain sufficient coverage for a desired number of customers.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A computer implemented process comprising:
   determining whether a time of day corresponds to a charging window, responsive to a determination that a vehicle is in a non-charging state;
   retrieving a start time and charge requirement for an upcoming journey;
   determining if sufficient time remains to charge a vehicle to the charge requirement, responsive to a determination that the time of day corresponds to the charging window;
   alerting a user to the non-charging state, responsive to a determination that insufficient time remains to charge the vehicle to the charge requirement; and
   alerting a user that a charge requirement cannot be met, responsive to a determination that a point in time past which a charge requirement cannot be met was prior to or is within a threshold range of a current time.

2. The method of claim 1, wherein the alerting the user further includes waiting until a predetermined period of non-charging time has passed, following the determination that the vehicle is in the non-charging state, prior to alerting the user of the non-charging condition.

3. The method of claim 2, wherein, if the predetermined period of non-charging time does not pass in an uninterrupted block of the vehicle remaining in the non-charging state, an instance of the alerting is cancelled.

4. The method of claim 1, wherein the alerting is further responsive to a determination that a vehicle is not currently charged to or above the charge requirement.

5. The method of claim 1, further comprising:
   approximating a start time based on observed previous behavior, if an attempt to retrieve a start time is unsuccessful.

6. The method of claim 1, further comprising:
   approximating a charge requirement based on observed previous behavior, if an attempt to retrieve a charge requirement is unsuccessful.

7. A non-transitory machine readable storage medium, storing instructions which, when executed by a processor, cause the processor to perform the method comprising:
   determining whether a time of day corresponds to a charging window, responsive to a determination that a vehicle is in a non-charging state;
   retrieving a start time and charge requirement for an upcoming journey;
   determining if sufficient time remains to charge a vehicle to the charge requirement, responsive to a determination that the time of day corresponds to the charging window;
   alerting a user to the non-charging state, responsive to a determination that insufficient time remains to charge the vehicle to the charge requirement; and
   alerting a user that a charge requirement cannot be met, responsive to a determination that a point in time past which a charge requirement cannot be met was prior to or is within a threshold range of a current time.

8. The machine readable storage medium of claim 7, wherein the alerting the user further includes waiting until a predetermined period of non-charging time has passed, following the determination that the vehicle is in the non-charging state, prior to alerting the user of the non-charging condition.

9. The machine readable storage medium of claim 8, wherein, if the predetermined period of non-charging time does not pass in an uninterrupted block of the vehicle remaining in the non-charging state, an instance of the alerting is cancelled.

10. The machine readable storage medium of claim 7, wherein the alerting is further responsive to a determination that a vehicle is not currently charged to or above the charge requirement.

11. The machine readable storage medium of claim 7, further comprising:
    approximating a start time based on observed previous behavior, if an attempt to retrieve a start time is unsuccessful.

12. The machine readable storage medium of claim 7, further comprising:
    approximating a charge requirement based on observed previous behavior, if an attempt to retrieve a charge requirement is unsuccessful.

13. A system comprising:
    a processor, in communication with a vehicle network;
    a local storage, in communication with the vehicle network;
    a vehicle power source, in communication with the vehicle network; and
    a transceiver, in communication with at least the processor, wherein the processor is configured to determine whether a time of day corresponds to a charging window, responsive to a determination that a vehicle is in a non-charging state, based at least in part on information retrieved from the vehicle network,
    retrieve a start time and charge requirement for an upcoming journey from the local storage, determine if sufficient time remains to charge a vehicle to the charge requirement, responsive to a determination that the time of day corresponds to the charging window, based at least in part on a difference between a current time and the start time, and at least in part on an observed rate of charging, alert a user to the non-charging state, responsive to a determination that insufficient time remains to charge the vehicle to the charge requirement, utilizing at least the transceiver to send a message for transmission to the user; and alert a user that a charge requirement cannot be met, responsive to a determination that a point in time past which a charge requirement cannot be met was prior to or is within a threshold range of a current time.

14. The system of claim 13, wherein the processor alerting the user further includes waiting until a predetermined period of non-charging time has passed, following the determination that the vehicle is in the non-charging state, prior to alerting the user of the non-charging condition.

15. The system of claim 14, wherein, if the predetermined period of non-charging time does not pass in an uninterrupted block of the vehicle remaining in the non-charging state, an instance of the processor alerting the user is cancelled.

16. The system of claim 13, wherein the processor alerting the user is further responsive to a determination that a vehicle is not currently charged to or above the charge requirement.

17. The system of claim 13, wherein the processor is further configured to approximate a start time based on observed previous behavior, if an attempt to retrieve a start time is unsuccessful.

* * * * *